(12) United States Patent
Lee

(10) Patent No.: US 8,296,798 B2
(45) Date of Patent: Oct. 23, 2012

(54) CHANNEL SEARCHING SYSTEM

(75) Inventor: Ji-Young Lee, Seoul (KR)

(73) Assignee: Alticast Co., Ltd., Seoul (KR)

( * ) Notice: Subject to any disclaimer, the term of this patent is extended or adjusted under 35 U.S.C. 154(b) by 483 days.

(21) Appl. No.: 12/076,698

(22) Filed: Mar. 21, 2008

(65) Prior Publication Data

US 2008/0235738 A1    Sep. 25, 2008

(30) Foreign Application Priority Data

Mar. 23, 2007  (KR) .................. 10-2007-0028389

(51) Int. Cl.
*G06F 3/00* (2006.01)
*G06F 13/00* (2006.01)

(52) U.S. Cl. ................. 725/41; 725/44; 725/52; 725/54

(58) Field of Classification Search ............ 725/41, 725/56, 43, 52
See application file for complete search history.

(56) References Cited

U.S. PATENT DOCUMENTS

| | | | |
|---|---|---|---|
| 7,174,512 B2* | 2/2007 | Martin et al. | 715/719 |
| 7,681,141 B2* | 3/2010 | Tu | 715/784 |
| 7,757,252 B1* | 7/2010 | Agasse | 725/41 |
| 2003/0159143 A1* | 8/2003 | Chan | 725/41 |
| 2006/0039481 A1* | 2/2006 | Shen et al. | 375/240.25 |
| 2006/0230427 A1* | 10/2006 | Kunkel et al. | 725/133 |
| 2007/0204297 A1* | 8/2007 | Gonzalez | 725/41 |
| 2007/0204302 A1* | 8/2007 | Calzone | 725/46 |
| 2010/0122294 A1* | 5/2010 | Craner | 725/41 |

FOREIGN PATENT DOCUMENTS

| | | |
|---|---|---|
| EP | 1 246 465 A2 | 10/2002 |
| EP | 1 619 888 A2 | 1/2006 |
| KR | 100411174 B1 | 12/2003 |
| KR | 10 2004 0110871 A | 12/2004 |
| KR | 10-2005-0056435 | 6/2005 |
| WO | WO 95/28795 A2 | 10/1995 |
| WO | WO 2005/107245 A1 | 11/2005 |

OTHER PUBLICATIONS

European Patent Office, Communication pursuant to Article 94(3) EPC, Application No. 08 005 534.6, mailed on Sep. 23, 2011.

* cited by examiner

*Primary Examiner* — Chris Parry
(74) *Attorney, Agent, or Firm* — Nath, Goldberg & Meyer; Jerald L. Meyer; Stanley N. Protigal

(57) ABSTRACT

A channel searching system includes a head end broadcasting a broadcasting signal over a broadcasting medium, and a receiver. The broadcasting signal includes a multi-channel video containing a plurality of videos and video configuration information on the videos. The receiver is capable of receiving the broadcasting signal over the broadcasting medium and showing a viewer a channel searching view edited from the multi-channel video based on the video configuration information and searching screen configuration information.

10 Claims, 4 Drawing Sheets

FIG. 1

| CH1 | CH2 | CH3 | CH4 | CH5 | CH6 | CH7 |
|---|---|---|---|---|---|---|
| VIDEO1 | VIDEO2 | VIDEO3 | VIDEO4 | VIDEO5 | VIDEO6 | VIDEO7 |
| CH8 | CH9 | CH10 | CH11 | CH12 | CH13 | CH14 |
| VIDEO8 | VIDEO9 | VIDEO10 | VIDEO11 | VIDEO12 | VIDEO13 | VIDEO14 |
| CH15 | CH16 | CH17 | CH18 | CH19 | CH20 | CH21 |
| VIDEO15 | VIDEO16 | VIDEO17 | VIDEO18 | VIDEO19 | VIDEO20 | VIDEO21 |
| CH22 | CH23 | CH24 | CH25 | CH26 | CH27 | CH28 |
| VIDEO22 | VIDEO23 | VIDEO24 | VIDEO25 | VIDEO26 | VIDEO27 | VIDEO28 |
| CH29 | CH30 | CH31 | CH32 | CH33 | CH34 | CH35 |
| VIDEO29 | VIDEO30 | VIDEO31 | VIDEO32 | VIDEO33 | VIDEO34 | VIDEO35 |
| CH36 | CH37 | CH38 | CH39 | CH40 | CH41 | CH42 |
| VIDEO36 | VIDEO37 | VIDEO38 | VIDEO39 | VIDEO40 | VIDEO41 | VIDEO42 |

CHANNEL SEARCHING SYSTEM

CROSS-REFERENCE TO RELATED APPLICATION

This application claims priority from and the benefit of Korean Patent Application No. 10-2007-0028389, filed on Mar. 23, 2007, which is hereby incorporated by reference for all purposes as if fully set forth herein.

BACKGROUND OF THE INVENTION

1. Field of the Invention

The present invention relates to a channel searching system, and more particularly, to a channel searching system providing a viewer with a channel searching view.

2. Description of the Related Art

Unlike analogue broadcasting, digital broadcasting uses digital data rather than analogue signals to carry broadcasts over television channels. Accordingly, the digital broadcasting may provide numerous benefits over the analogue broadcasting, e.g. improved operational flexibility, possibility for new services that go beyond the scope of the conventional television programs for the broadcaster, and improved video and audio quality, improved program and service choices and possibility for interactivity with the service provider for the user.

However, digital broadcasting provides a slow channel changing speed as compared to analogue broadcasting because a broadcasting signal can not be reproduced until a frame of broadcasting signal is received in receiver.

Moreover, so many numbers of channels for a viewer may operate as a factor of delaying the viewer from scanning a desired channel.

Recently, mosaic electronic program guides ("EPGs"), and other mini EPGs have been introduced to overcome such problems.

A mosaic EPG shows multiple channels arranged in a mosaic pattern on a TV screen to help a viewer select a desired one from the channels. A Mini EPG is a text-based EPG, which contains the information on a broadcasting video broadcast through a channel. Viewers may select a desired channel using various channel information contained in mosaic EPG or mini EPG.

However, a conventional mosaic EPG has problems that there occurs a considerable loss in bandwidth since it contains additional information regarding the configuration of a TV screen and each channel needs to be allotted to each EPG view, separate equipment is required to transmit each EPG view over each channel, and a time period for EPG view conversion is longer than that for channel conversion. In mini EPGs, it is difficult for a viewer to notice a broadcasting video broadcast through a certain channel because mini EPGs provide a text-based user interface.

And, mosaic EPGs and mini EPGs can not meet the needs of viewers who are accustomed to intuitively changing TV channels while watching a current broadcasting video.

SUMMARY OF THE INVENTION

Accordingly, the present invention has been designed to solve the aforementioned problems and an aspect of the present invention provides a channel searching view to a viewer, on which a multi-channel video has been edited based on video configuration information and searching screen configuration information. As set forth herein, the multi-channel video includes a plurality of videos. The video configuration information and the searching screen configuration information are required to edit each video.

Additional features of the invention will be set forth in the description which follows, and in part will be apparent from the description, or may be learned by practice of the invention.

An exemplary embodiment of the present invention provides a channel searching system including: a head end broadcasting a broadcasting signal over a broadcasting medium, the broadcasting signal including a multi-channel video containing a plurality of videos and video configuration information on the videos; and a receiver receiving the broadcasting signal over the broadcasting medium and showing a viewer a channel searching view edited from the multi-channel video based on the video configuration information and searching screen configuration information.

The video configuration information includes first location information indicating a location of each video contained in the multi-channel video, and first size information indicating a size of each video contained in the multi-channel video.

The searching screen configuration information is sent to the receiver, while being included in the broadcasting signal.

The searching screen configuration information is sent to the receiver in response to the viewer pressing a key.

The searching screen configuration information includes second location information indicating a location of each video contained in the multi-channel video, and second size information indicating a size of each video contained in the multi-channel video.

The receiver clips the videos from the multi-channel video base on the first location information and the first size information.

The receiver scales the clipped videos according to the second size information.

The receiver locates the scaled videos on the channel searching view according to the second location information.

The receiver receives a broadcasting signal containing the multi-channel video in response to the viewer pressing a first key corresponding to a channel searching start command, and highlights a video that a view has watched before the viewer presses the first key.

The receiver changes highlighting from a current highlighted video to another one in response to the viewer pressing a second key corresponding to a highlighted video moving command.

An exemplary embodiment of the present invention provides a channel searching system receiving a broadcasting signal from a head end, the broadcasting signal including a multi-channel video containing a plurality of videos and video configuration information on the videos, the channel searching system including: an extracting unit receiving the broadcasting signal to extract the multi-channel video and the video configuration information from the broadcasting signal; a channel searching view generating unit editing the multi-channel video based on searching screen configuration information and the video configuration information to generate a channel searching view and providing the channel searching view to a viewer; and a channel searching managing unit requesting the extracting unit to receive the broadcasting signal and requesting the channel searching view generating unit to generate the channel searching view and provide the generated channel searching view to the viewer in response to a channel searching command provided by the viewer.

The video configuration information includes first location information indicating a location of each video contained in the multi-channel video, and first size information indicating a size of each video contained in the multi-channel video.

The searching screen configuration information includes second location information indicating a location of each video contained in the multi-channel video, and second size information indicating a size of each video contained in the multi-channel video.

The searching screen configuration information is provided in response to the viewer pressing a key or provided from the head end while being contained in the broadcasting signal.

It is to be understood that both the foregoing general description and the following detailed description are exemplary and explanatory and are intended to provide further explanation of the invention as claimed.

BRIEF DESCRIPTION OF THE DRAWINGS

The above and other features of the present invention will be described in reference to certain exemplary embodiments thereof with reference to the attached drawings in which:

FIG. 1 is a view illustrating a multi-channel video usable in a channel searching system according to an exemplary embodiment of the present invention;

FIGS. 5 and 6 are views illustrating another exemplary channel searching view provided by a receiver shown in FIG. 2.

DETAILED DESCRIPTION OF THE INVENTION

Figure 2:
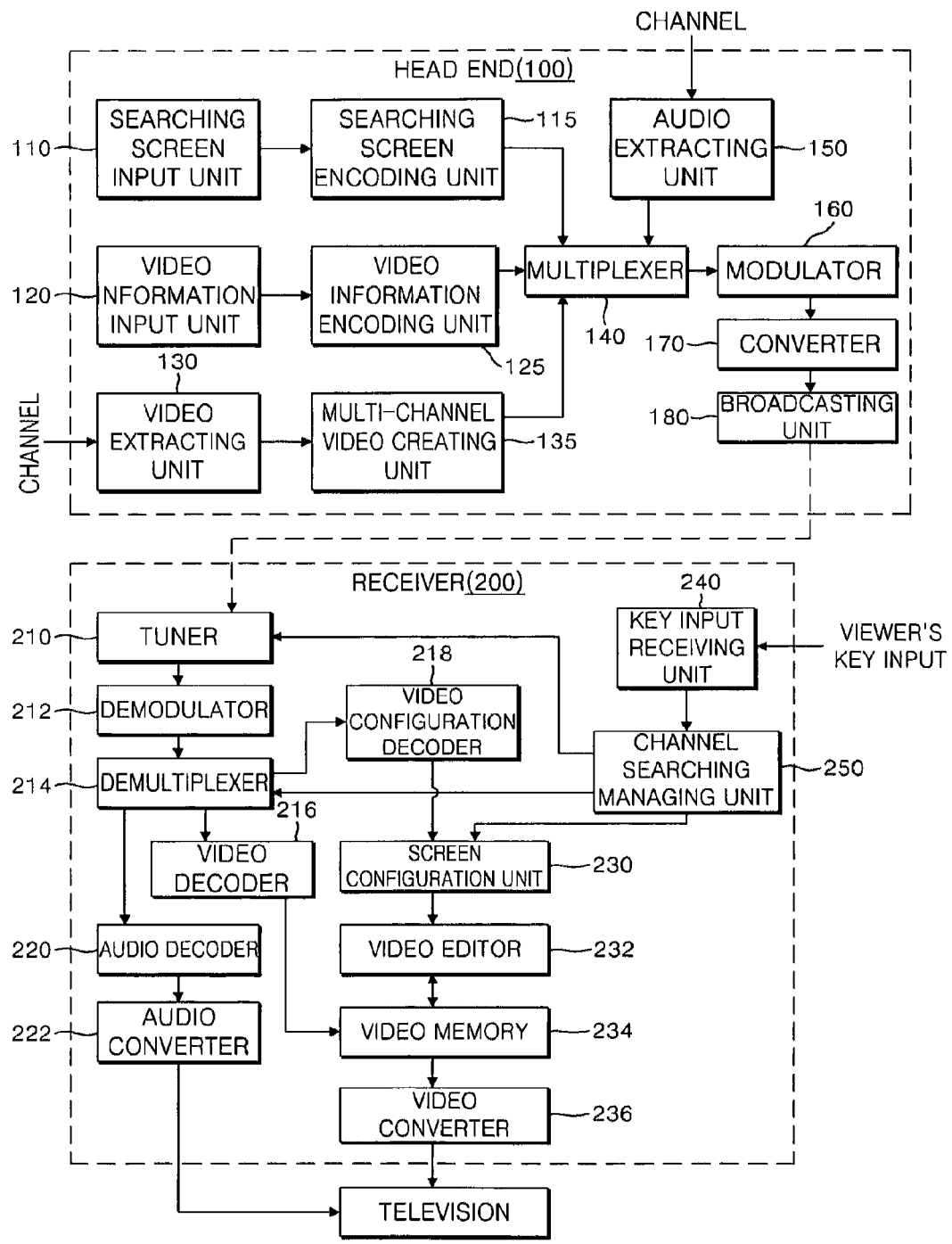
FIG. 2 is a block diagram illustrating a channel searching system according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a view illustrating a multi-channel video usable in a channel searching system according to an exemplary embodiment of the present invention. Referring to FIG. 1, the multi-channel video, corresponding to a full screen image of a TV, includes a plurality of videos VIDEO1 to VIDEO42, each being a broadcasting program broadcast through each of a plurality of channels CH1 to CH42. The number of the videos may vary with applicable examples. Each of videos VIDEO1 to VIDEO42 has a constant size and is arranged at a prescribed location on the full screen image.

The multi-channel video may be made by a head end of a broadcasting station, and sent to a receiver over broadcasting medium together with video configuration information and searching screen configuration information.

The video configuration information includes first location information, first size information, a channel name, and a channel number. The first location information indicates the location of each video on the full screen image. The first size information indicates a first size of each video. The channel name indicates the name of a channel through which a video is broadcast. The channel number corresponds to each channel name.

The searching screen configuration information refers to information on how a channel searching view to be provided to a viewer will be configured on a TV screen. The searching screen configuration information includes second location information and second size information. The second location information includes information on where each video will be arranged on the TV screen. The second size information indicates a second size of each video.

The receiver may provide a viewer with a channel searching view on which videos are edited and arranged in a pattern by using the video configuration information and the searching screen configuration information. Such editing includes clipping each video from the multi-channel video based on the first location information and the first size information, scaling the clipped video based on the second size information, and transiting the clipped video on the channel searching view base on the second location information.

FIG. 2 is a block diagram illustrating a channel searching system according to an exemplary embodiment of the present invention. Referring to FIG. 2, the channel searching system includes a head end 100 and a receiver 200.

Head end 100 includes a searching screen input unit 110, a searching screen encoding unit 115, a video information input unit 120, a video information encoding unit 125, a video extracting unit 130, a multi-channel video creating unit 135, a multiplexer 140, an audio extracting unit 150, a modulator 160, a converter 170, and a broadcasting unit 180.

Searching screen input unit 110 provides searching screen encoding unit 115 with the searching screen configuration information entered by an operator.

Searching screen encoding unit 115 encodes searching screen configuration information provided from searching screen input unit 110, and then supplies the encoded information to multiplexer 140.

Video information input unit 120 provides video information encoding unit 125 with video configuration information entered by an operator.

Video information encoding unit 125 encodes the video configuration information using an encoding scheme, such as "Private Section", "Private Table", and "Private Descriptor", and then supplies the encoded information to multiplexer 140.

Video extracting unit 130 extracts broadcasting videos from a plurality of external channels, and then supplies the extracted videos to multi-channel video creating unit 135.

Multi-channel video creating unit 135 creates a multi-channel video using the extracted videos, and then supplies the created multi-channel video to multiplexer 140.

Audio extracting unit 150 extracts the audio from a plurality of external channels. Each audio corresponds to each video included in a multi-channel video. Audio extracting unit 150 supplies the extracted audio to multiplexer 140.

Multiplexer 140 multiplexes the encoded searching screen configuration information, the encoded video configuration information, the multi-channel video, and the audio to create a broadcasting signal, and then supplies the broadcasting signal to modulator 160.

Modulator 160 modulates the broadcasting signal to comply with standards for broadcasting media, and then supplies the modulated broadcasting signal to converter 170. The broadcasting media may include terrestrial, cable, and satellite media.

Converter 170 converts the modulated broadcasting signal into a desired frequency of signal and assigns a specific channel to the converted signal. And then, converter 170 supplies the converted signal to broadcasting unit 180.

Broadcasting unit 180 broadcasts the converted broadcasting signal over broadcasting media. Receiver 200 may receive the broadcasting signal.

More specifically, receiver 200 receives the broadcasting signal containing the multi-video in response to the viewer pressing a key, and generates a channel searching view on which a plurality of videos are rearranged using the video configuration information and the searching screen configuration information contained in the broadcasting signal. Receiver 200 provides the generated channel searching view to the viewer, and highlights a video selected by the viewer pressing a key to let the viewer know which video has been selected.

Receiver 200 includes a key input receiving unit 240, a channel searching managing unit 250, a demodulator 212, a demultiplexer 214, an audio decoder 220, an audio converter 222, a video decoder 216, a video configuration decoder 218, a screen configuration unit 230, a video editor 232, a video memory 234, and a video converter 236.

Key input receiving unit 240 generates a command in response to the viewer pressing a key provided on a key input means (not shown), such as a remote controller and a key board, and supplies the generated command to channel searching managing unit 250. The command may include a channel searching start command, a channel searching end command, a highlighted video moving command, and a channel selecting command.

Channel searching managing unit 250 carries out the command supplied from key input receiving unit 240. The channel searching start command enables channel searching managing unit 250 to request a tuner 210 to tune a channel through which a multi-channel video broadcasts. The channel searching end command enables channel searching managing unit 250 to request tuner 210 to stop tuning. The highlighted video moving command enables channel searching managing unit 250 to request screen configuration unit 230 to change the highlighted video to another one. The channel selecting command enables channel searching managing unit 250 to request tuner 210 to select and tune a channel.

Tuner 210 extracts the broadcasting signal corresponding to a frequency band assigned to the channel in response to a request from channel searching managing unit 250. And then, tuner 210 supplies the extracted broadcasting signal to demodulator 212. The extracted broadcasting signal may include a multi-channel video, audio, video configuration information, and searching screen configuration information.

Demodulator 212 demodulates the extracted broadcasting signal supplied from tuner 210 and sends the demodulated signal to demultiplexer 214.

Demultiplexer 214 demultiplexes the demodulated signal into a multi-channel video, audio, video configuration information, and searching screen configuration information according to a request from channel searching managing unit 250. Demultiplexer 214 sends the multi-channel video to video decoder 216, and video configuration information and searching screen configuration information to video configuration decoder 218. Demultiplexer 214 extracts the audio corresponding to the highlighted video and sends the audio to audio decoder 220.

Audio decoder 220 decodes the audio into the original audio and then sends the decoded audio to audio converter 222.

Audio converter 222 converts the audio into an analogue signal and then sends the analogue signal to a TV. The TV reproduces the audio as a sound.

Video decoder 216 decodes the multi-channel video supplied from demultiplexer 214 into the uncompressed original multi-channel video. Video decoder 216 supplies the decoded multi-channel video to video memory 234.

Video configuration decoder 218 decodes the encoded searching screen configuration information and the video configuration information supplied from demultiplexer 214 and then sends the result to screen configuration unit 230.

Screen configuration unit 230 generates a channel searching view generating request including video configuration information and searching screen configuration information, and then sends the channel searching view generating request to video editor 232.

The channel searching view generating request may include a highlighted video changing request provided from channel searching managing unit 250.

Video editor 232 edits the multi-channel video stored in video memory 234 to produce the plurality of rearranged videos in response to the channel searching view generating request.

More specifically, video editor 232 clips each broadcasting video region by using the first location information and the first size information of each video contained in video configuration information. Video editor 232 scales and transits each clipped video to create each video rearranged based on the second location information and the second size information contained in the searching screen configuration information. Video editor 232 stores the rearranged video to video memory 234.

Video memory 234 stores the multi-channel video provided from video decoder 216 and the rearranged video provided from video editor 232.

Video converter 236 converts the rearranged video provided form video memory 234 into an analogue video. The analogue video appears on a viewer's TV screen as a channel searching view.

Although a case where the searching screen configuration information is provided together with a multi-channel video from the head end to the receiver has been described according to an exemplary embodiment of the present invention, the present invention is not limited thereto. For example, the present invention may be configured so that the searching screen configuration information may be directly provided to the receiver by the viewer pressing a key or may be previously stored in the receiver.

And, tuner 10, demodulator 212, demultiplexer 214, video decoder 216, and video configuration decoder 218 may constitute an extracting unit that receives a broadcasting signal through broadcasting medium and extracts multi-channel video and video configuration information from the broadcasting signal. Screen configuration unit 230, video editor 232, video memory 234, and video converter 236 may constitute a channel searching view generating unit that edits a multi-channel video based on the searching screen configuration information and video configuration information to a channel searching view, and provides the channel searching view to a viewer.

Searching screen configuration information may include grouping information to enable a plurality of videos to be grouped into each theme. The grouping information may contain the third location information on the location of the grouped theme to be arranged on any part of TV screen, and other information on the videos included in each grouped theme.

Figure 3:
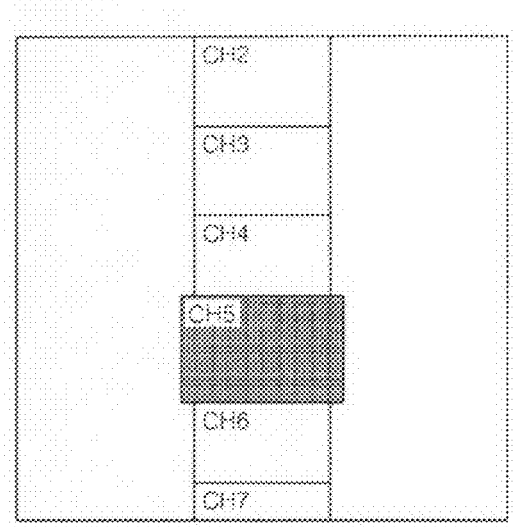
FIGS. 3 and 4 are views illustrating an exemplary channel searching view provided by a receiver shown in FIG. 2.

FIG. 3 is a view illustrating an exemplary channel searching view provided by the receiver 200 shown in FIG. 2. Referring to FIG. 3, videos arranged in a column appear on TV screen when receiver 200 receives second location information.

When a channel searching start command is entered to receiver 200, the videos contained a multi-channel video are rearranged according to the second location information and the second size information. The video broadcasted through channel ("CH") 5 may be set as a default and highlighted prior to the input of the channel searching start command. The entire TV screen may be occupied by a still image of the highlighted video set as the default.

The viewer may change the highlighted video into another one by pressing a key corresponding to the highlighted video moving command while still watching the videos broadcasted through a plurality of channels in channel searching view. The key corresponding to the highlighted video moving command may include an "UP" key and a "DOWN" key.

Figure 4:
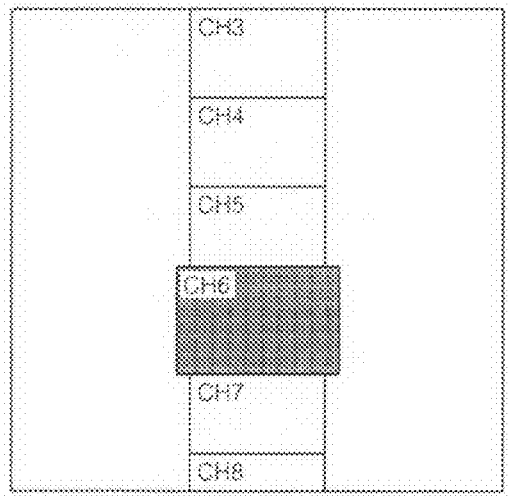

FIG. 4 shows a case where the video corresponding to channel 6 has been highlighted by the viewer pressing UP key. Referring to FIG. 4, the videos moves upward by an increment of one video, and simultaneously previous highlighted video (corresponding to CH5) returns to the normal appearance, i.e. the highlighting eliminated, with the video (corresponding to CH6) placed right under the previous highlighted video, i.e. CH5, newly highlighted. The viewer may continuously change the highlighted video into another one by consecutive input operations. Receiver 200 allows the highlighted video to appear on the entire TV screen in response to the viewer pressing a key corresponding to a channel selecting command.

Figures 5, 6:
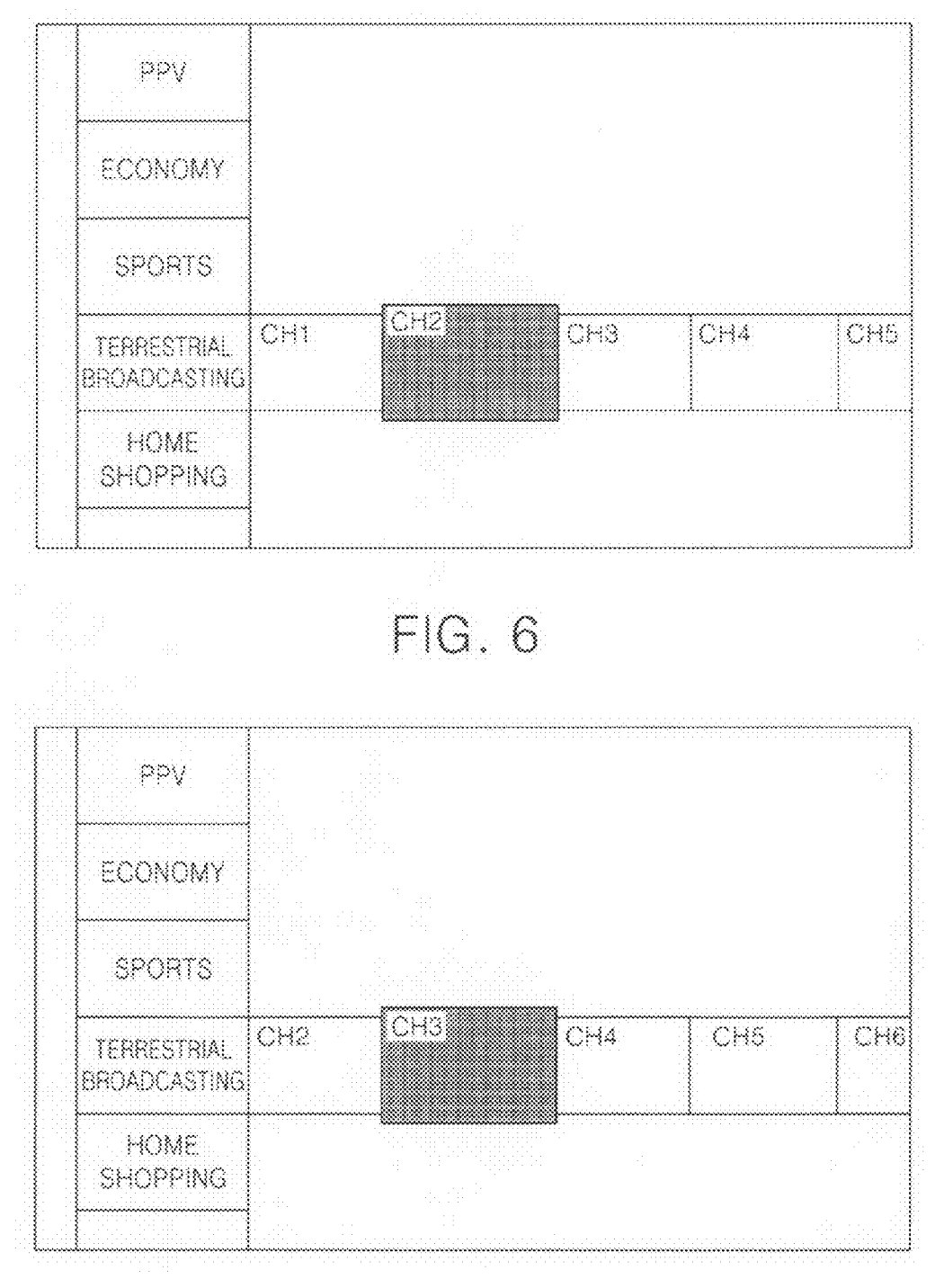

FIG. 5 is a view illustrating another exemplary channel searching view provided by the receiver 200 shown in FIG. 2. The searching screen configuration information further includes grouping information.

The videos arranged in a row and the group themes in a column appear on TV screen when receiver 200 receives the second location information and third location information, respectively.

Referring to FIG. 5, the videos may belong to any one grouping theme, such as "PPV" (pay per view), "Economy", "Sports", "Terrestrial Broadcasting", and "Home Shopping" according to its characteristics. For example, the videos corresponding to CH1, CH2, CH3, CH4, CH5, and CH6 may belong to "Terrestrial Broadcasting"

When a channel searching start command is received to receiver 200, the videos are grouped into each theme according to the second location information, the second size information, and the third location information. The video broadcasted through channel 2 may be set as a default and highlighted prior to the input of the channel searching start command. The entire TV screen may be occupied by a still image of the highlighted video set as the default.

The viewer may change the highlighted video into another one by pressing a key corresponding to the highlighted video moving command while watching the videos broadcasted through a plurality of channels. The key corresponding to the highlighted video moving command may include a "LEFT" key and a "RIGHT" key.

FIG. 6 shows a case where the video corresponding to channel 6 has been highlighted by the viewer pressing RIGHT key. Referring to FIG. 6, the videos moves leftward by an increment of one video and simultaneously previous highlighted video (corresponding to CH2) returns to the normal appearance, i.e. the highlighting eliminated, with the video (corresponding to CH3) placed right under the previous highlighted video newly highlighted. The viewer may continuously change the highlighted video into another one by consecutive input operations. Receiver 200 allows the highlighted video to appear on the entire TV screen in response to the viewer pressing a key corresponding to a channel selecting command.

As described above, the present invention may provide a viewer with a channel searching view on which a plurality of videos have been edited, which enables the viewer to intuitively select a desired channel while watching a current video without any delay in channel change.

In addition, the present invention may reduce a loss in bandwidth because of using a multi-channel without additional information other than videos.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A channel searching system comprising:

a head end for broadcasting a broadcasting signal over a broadcasting medium, the broadcasting signal comprising a multi-channel video containing a plurality of menu display videos edited from multiple channels and video configuration information on the videos; and a receiver for receiving the broadcasting signal over the broadcasting medium and showing a viewer a channel searching view displaying menu display videos corresponding to multiple channels, the menu display videos edited from the multi-channel video based on the video configuration information and searching screen configuration information, and producing a plurality of rearranged videos in response to a channel searching view generating request, wherein the receiver provides highlights of one of said menu display videos in response to a selection, and an entire TV screen display in response to the selection, wherein the viewer may change the highlighted one of menu display videos into another one by pressing a first key corresponding to a highlighted one of menu display videos moving command while still viewing the multiple channels in the channel searching view, and enabling changing the highlighted video and enabling the viewer to select and tune a highlighted channel, wherein the video configuration information comprises first location information indicating a location of each video in the multi-channel video, and first size information indicating a size of each menu display video in the multi-channel video, wherein the searching screen configuration information is sent to the receiver, while being included in the broadcasting signal as at least one channel, wherein the searching screen configuration information comprises second location information indicating a location of each video in the channel searching view arranged on the TV screen, and second size information indicating a size of each menu display video in the channel searching view arranged on the TV screen, wherein the receiver obtains videos for the channel searching view by clipping the menu display videos from the multi-channel video based on the first location information and the first size information, scales the clipped menu display videos according to the second size information, and locates the scaled menu display videos on the channel searching view according to the second location information, wherein if the receiver receives a channel searching start command, the receiver rearranges the menu display videos contained in a multi-channel video according to the second location information and the second size information, and wherein the display of the clipped menu display videos provide the viewer with the channel searching view which enables the viewer to intuitively select a desired channel while watching a current video without delay in channel change, with the use of the multi-channel video reduces loss in bandwidth from a menu display function.

2. The channel searching system of claim 1, wherein the searching screen configuration information is sent to the receiver in response to the viewer pressing a second key.

3. The channel searching system of claim 2, wherein the receiver receives a broadcasting signal containing the multi-channel video in response to the viewer pressing a third key corresponding to the channel searching start command, and highlights a video that the viewer has watched before the viewer presses the third key.

4. The channel searching system of claim 3, wherein the receiver changes highlighting from a current highlighted one of menu display videos to another one in response to the viewer pressing a fourth key corresponding to a highlighted menu display videos moving command.

5. A channel searching system receiving a broadcasting signal from a head end, the broadcasting signal comprising a multi-channel video containing a plurality of menu display videos edited from multiple channels and video configuration information on the videos, the channel searching system comprising:

an extracting unit for receiving the broadcasting signal to extract the multi-channel video and the video configuration information from the broadcasting signal;

a channel searching view generating unit for editing the multi-channel video based on searching screen configuration information and the video configuration information to generate a channel searching view displaying menu display videos comprising a plurality of rearranged videos corresponding to multiple channels and providing the channel searching view to a viewer; and a channel searching managing unit for requesting the extracting unit to receive the broadcasting signal and requesting the channel searching view generating unit to generate the channel searching view and provide the generated channel searching view to the viewer in response to a channel searching command provided by the viewer, wherein the channel searching view generating unit provides highlights of one of said menu display videos in response to a selection, and permits display of an entire TV screen display of an image in response to the selection, wherein the viewer may change a highlighted one of menu display videos into another one by pressing a first key corresponding to a highlighted menu display videos moving command while still viewing the multi-channel video in channel searching view, and enabling changing the highlighted video and enabling the viewer to select and tune a highlighted channel, wherein the video configuration information comprises first location information indicating a location of each video in the multi-channel video, and first size information indicating a size of each menu display video in the multi-channel video, wherein the searching screen configuration information is sent to the extracting unit, while being included in the broadcasting signal as at least one channel, wherein the searching screen configuration information comprises second location information indicating a location of each menu display video in the channel searching view arranged on the TV screen, and second size information indicating a size of each menu display video in the channel searching view arranged on the TV screen, wherein the channel searching view generating unit obtains videos for the channel searching view by clipping the menu display videos from the multi-channel video based on the first location information and the first size information, scales the clipped menu display videos according to the second size information, and locates the scaled menu display videos on the channel searching view according to the second location information, whereon, on receipt of a channel searching start command, the channel searching view generating unit rearranges the menu display videos contained in a multi-channel video according to the second location information and the second size information, and wherein the display of the clipped menu display videos provide the viewer with the channel searching view which enables the viewer to intuitively select a desired channel while watching a current video without delay in channel change, with the use of the multi-channel video reduces loss in bandwidth from a menu display function.

6. The channel searching system of claim 5, wherein the searching screen configuration information is provided in response to the viewer pressing a second key or provided from the head end while being contained in the broadcasting signal.

7. A channel searching system comprising:

a receiver for receiving a broadcasting signal from a head end for broadcasting a broadcasting signal over a broadcasting medium, the broadcasting signal comprising a multi-channel video containing a plurality of menu display videos edited from multiple channels, searching screen configuration information, and video configuration information on the videos;

wherein said receiver produces a plurality of rearranged videos in response to a channel searching view generating request, wherein the receiver provides highlights of one of said menu display videos in response to a selection, and permits display of an entire TV screen display of an image in response to the selection, wherein the viewer may change a highlighted one of menu display videos into another one by pressing a first key corresponding to a highlighted one of menu display videos moving command while still viewing the multiple channels in the channel searching view, and enabling changing the highlighted video and enabling the viewer to select and tune a highlighted channel, wherein the video configuration information comprises first location information indicating a location of each video in the multi-channel video, and first size information indicating a size of each menu display video in the multi-channel video, wherein the searching screen configuration information is sent to the receiver, while being included in the broadcasting signal as at least one channel, wherein the searching screen configuration information comprises second location information indicating a location of each video in the channel searching view arranged on the TV screen, and second size information indicating a size of each menu display video in the channel searching view arranged on the TV screen, wherein the receiver obtains videos for the channel searching view by clipping the menu display videos from the multi-channel video based on the first location information and the first size information, scales the clipped menu display videos according to the second size information, and locates the scaled menu display videos on the channel searching view according to the second location information, wherein if the receiver receives a channel searching start command, the receiver rearranges the menu display videos contained in a multi-channel video according to the second location information and the second size information, and wherein the display of the clipped menu display videos provide the viewer with the channel searching view which enables the viewer to intuitively select a desired channel while watching a current video without delay in channel change, with the use of the multi-channel video reduces loss in bandwidth from a menu display function.

8. The channel searching receiver of claim 7, wherein the receiver receives searching screen configuration information sent to the receiver in response to the viewer pressing a second key.

9. The channel searching system of claim 8, wherein the receiver receives a broadcasting signal containing the multi-channel video in response to the viewer pressing a third key corresponding to the channel searching start command, and highlights a video that the viewer has watched before the viewer presses the third key.

10. The channel searching system of claim 9, wherein the receiver changes highlighting from a current highlighted one of menu display videos to another one in response to the viewer pressing a fourth key corresponding to a highlighted menu display videos moving command.

* * * * *